United States Patent [19]

Danielmeyer et al.

[11] 4,103,173

[45] Jul. 25, 1978

[54] FLUORESCENT SCREEN

[75] Inventors: Hans-Günter Danielmeyer, Wedel; Werner Hartmann, Esslingen-Berkheim, both of Fed. Rep. of Germany

[73] Assignee: Max Planck Gesellschaft zur Forderung der Wissenschaften e. V., Göttingen, Fed. Rep. of Germany

[21] Appl. No.: 659,469

[22] Filed: Feb. 19, 1976

[30] Foreign Application Priority Data

Feb. 24, 1975 [DE] Fed. Rep. of Germany ....... 2507877

[51] Int. Cl.$^2$ .......................... G01J 1/58; G01N 21/38
[52] U.S. Cl. .............................. 250/483; 252/301.4 R
[58] Field of Search .......................... 250/213 VT, 483; 252/301.4 R, 301.4 H

[56] References Cited

U.S. PATENT DOCUMENTS

| 2,851,612 | 9/1958 | Davey | 250/483 |
| 3,617,743 | 11/1971 | Rabatin et al. | 250/483 X |
| 3,868,512 | 2/1975 | Prener et al. | 250/483 |
| 3,925,674 | 12/1975 | D'Silva et al. | 250/483 |

Primary Examiner—Archie R. Borchelt
Attorney, Agent, or Firm—Hans Berman

[57] ABSTRACT

A fluorescent screen whose fluorescent material is a pure rare earth compound such as a compound of the formulas $(A_2O)_a$ $(Ln_2O_3)_b(P_2O_5)_c$, $(Ln_2O_3)_p(Al_2O_3)_q(B_2O_3)_r$, or $LnZrF_7$ wherein $a$ is zero or an integer greater than zero, $b$, $c$, $p$, $q$, and $r$ are integers greater than zero, A is at least one alkali metal, and Ln is at least one rare earth metal.

11 Claims, No Drawings

FLUORESCENT SCREEN

This invention relates to luminescent screens, and particularly to a fluorescent screen which emits visible electromagnetic radiation in response to incident radiation invisible to the human eye, particularly X-rays.

Fluorescent screens are resorted to for investigating the internal structure of objects in X-ray topography, in medical radiology, and in other fields in which it is desired to convert a pattern of invisible X-rays into a visible image. Fluorescent screens are similarly employed for visualizing patterns of cathode rays.

The fluorescent materials employed in known screens are generally in the form of powders of small grain size, a known, typical material being granular manganese-doped zinc orthosilicate deposited in a thin layer on an optically transparent sheet material, such as glass. Best results are achieved with known screens if the particle size of the fluorescent material is in the range of a few $\mu m$.

The particle size limits the attainable resolution in the visible image. The resolution could be improved greatly if it were possible to synthesize a screen in the form of a homogeneous glassy or monocrystalline layer instead of particulate conventional material. Fluorescent screens forming monocrystalline layers, however, were not known heretofore.

The luminescent effect of fluorescent screens is due to electronic excitation of active ions in the lattice of the fluorescent material, such as the manganese ions, in the afore-mentioned zinc orthosilicate. In order to produce a useful image, the energy of excitation must be released by the emission of visible radiation, and not by internal decay. A useful fluorescent material thus must contain ions having a gap in their spectrum of electronic excitation which is sufficiently great not to be capable of being bridged by lattice oscillations.

Another necessary property of good fluorescent screen material is a high luminous intensity, that is, a high density of active ions. Yet, despite this high density, the ions must be well shielded from each other to prevent rapid spreading of the exciting energy among the ions and the resulting loss of resolution and intensity.

The primary object of the invention is the provision of a fluorescent screen whose active material satisfies the requirements outlined above, and thus produces superior visible images.

According to our invention such superior images are generally produced by screens consisting essentially of any pure non-metallic rare earth compound provided the rare earth ions are spaced more than 5A apart. Specifically, such images are produced, particularly in response to X-rays, by a screen whose fluorescent material consists essentially of at least one compound of the formulas $$(A_2O)_a(Ln_2O_3)_b(P_2O_5)_c \qquad (I)$$
$$(Ln_2O_3)_p(Al_2O_3)_q(B_2O_3)_r \qquad (II)$$

or $$LnZrF_7 \qquad (III)$$

wherein $a$ is zero or a positive integer, $b, c, p, q,$ and $r$ are positive integers, each integer being preferably not greater than 7, A is alkali metal or a mixture of alkali metals, and Ln is a rare earth metal or a mixture of rare earth metals.

The fluorescent materials deposited on a carrier in a fluorescent screen of the invention are distinguished by forming very stable, stoichiometric single crystals of high density of active ions, good shielding, and high quantum yields. Therefore, they are particularly suitable for excitation by X-rays, but may also be employed to advantage for visualizing patterns of other radiation, such as electron beams. Some of the compounds which are employed as luminescent materials in the screens of the invention are known in themselves. The known compounds are $LiNdP_4O_{12}$, $NdP_5O_{14}$, and $NdAl_3B_4O_{12}$. Other compounds of Formula (I) are prepared by the method described in the published German Patent Application 2342182 and also published by Yamada et al [J. Appl. Phys. 45 (1974) 5096]. Compounds of Formula (II) are prepared by the known method of A. Bobman [Ann. Mineralog. 47 (1962) 1380].

The fluorescent materials employed in the screens of the invention are suitable crystalline laser materials. We discovered that the basic requirements to be met by a material suitable for laser crystals are also basic for a good fluorescent material according to the invention.

In the fluorescent screens of the invention, the fluorescent materials are preferably present in the form of a single crystal layer. The thickness of the layer may be up to 20 microns. No improvement is achieved at greater thickness because of the limited penetrating power of X-rays and electron beams. All kinds of fluorescent screens which permit the use of a layer of fluorescent material having a thickness up to 20 $\mu$ may be made according to the invention, such as screens for medical radioscopy and amplifying foils. The fluorescent materials may also be employed in the form of amorphous glasses, particularly when the values of $a, b, c, q, r,$ or $p$ are greater than 7 and up to about 100.

The following Table lists light yields and luminescent colors of screens consisting of pure rare earth compounds in the form of single crystals. The light yield data are expressed in percent of the light yield of our best conventional screen whose fluorescent material is granular, manganese-doped zinc orthosilicate deposited on a glass carrier.

TABLE

|   | Compounds | Yield % | Color |
|---|---|---|---|
| a=0 | $TbP_5O_{14}$ | 90 | whitish-blue |
| b=1 | $Y_{0.6}Tb_{0.3}Yb_{0.1}P_5O_{14}$ | 40 | whitish-blue |
| c=5 | $Ce_{0.33}Eu_{0.67}P_5O_{14}$ | 40 | red |
|   | $YbP_5O_{14}$ | 15 | white and infrared |
| a=1 | $LiTbP_4O_{12}$ | 110 | whitish-blue |
| b=1 | $KTbP_4O_{12}$ | 100 | whitish-blue |
| c=4 |   |   |   |
| p=1 | $TbAl_3B_4O_{12}$ | 90 | whitish-blue |
| q=3 | $PrAl_3B_4O_{12}$ | 5 | whitish-green |
| r=4 |   |   |   |
|   | $TbZrF_7$ | 40 | whitish-blue |

The decay time of the luminescence from these screens ranged from $10^{-8}$ seconds ($PrAl_3B_4O_{12}$) to $10^{-3}$ seconds ($TbP_5O_{14}$). The image resolution, limited by the diffusion of excited states through the lattice, is better than 1000 A. The characteristic graininess of images produced by conventional screens is absent. Although the materials in our table represent only a first try their efficiency is comparable to that of the best conventional screen. This is certainly a consequence of the large density of rare earth ions and the stoichiometry, i.e., the fact that the active ions are not doped into the material but regularly distributed in the lattice.

Pure rare earth compounds, including the ones listed in our table, can be used directly for fluorescent screens. It may be advantageous, however, to use thin layers of said compounds deposited on a substrate. One possibility for deposition is to sputter the compound onto quartz glass or another suitable substrate. Another possibility is to prepare the compounds in a glassy form according to the method described for $NdP_5O_{14}$ in the German Patent Application No. P2342182.1-41 filed Aug. 21, 1973, and deposit them on quartz glass or another suitable substrate according to the method described for $NdP_5O_{14}$ in the German Patent 2417963.

Alternatively, a layer of the pure rare earth compound can be grown epitaxially onto a substrate. Suitable substrates for $TbP_5O_{14}$, for instance, are $La_xY_{1-x}P_5O_{14}$ with $0.1 < X < 0.2$ and $Gd_xY_{1-x}P_5O_{14}$ with $0.5 < X < 0.6$. They were prepared with the method basically known from the German Patent Application P 2342182.1-41 filed Aug. 21, 1973. Their lattice constants closely match those of $TbP_5O_{14}$ within the range given for $x$. Lattice constants depend on the average of the ionic radii of the rare earth ions in the crystal according to the expitaxy-section p.271 of H. G. Danielmeyer in: Festkorperprobleme (Advances in Solid State Physics), Vol. XV, pp.253-275, H. J. Queisser (ed., Pergamon/Vieweg, Braunschweig (1975). When a saturated solution of terbium oxide in polyphosphoric acid was poured at 550° C over these substrates, the desired layer of $TbP_5O_{14}$ grew epitaxially within a few minutes. It was found to be advantageous to add 10% by weight of $Gd_2O_3$ or $Y_2O_3$ to terbium oxide before heating said solution: the epitaxial layer can match its lattice constant to that of the substrate by automatically incorporating the required portion of Gd or Y into the lattice of the layer.

What is claimed is:

1. Apparatus for producing a visible image in response to invisible radiation comprising:
   (a) a source of ultraviolet rays, X-rays, δ-rays, or rays of charged particles; and
   (b) a fluorescent screen exposed to rays from said source and including a layer of fluorescent material, said material being a compound having a formula selected from the group consisting of $(A_2O)_a(Ln_2O_3)_b(P_2O_5)_c$, $(Ln_2O_3)_p(Al_2O_3)_q(B_2O_3)_r$, and $LnZrF_7$
   wherein
   $a$ is zero or a positive integer not greater than 100, $b$, $c$, $p$, $g$, and $r$ are positive integers not greater than 100,
   A is at least one alkali metal, and
   Ln is at least one rare earth metal, the ions of said rare earth metal being spaced apart in said compound more than 5 Angstrom units.

2. Apparatus as set forth in claim 1, wherein said layer essentially consists of said material in the form of an amorphous glass.

3. Apparatus as set forth in claim 1, wherein the thickness of said layer is not greater than 20 microns.

4. Apparatus as set forth in claim 1, wherein said screen further includes a carrier substrate, said layer being deposited on said substrate.

5. Apparatus as set forth in claim 4 wherein said substrate is amorphous.

6. Apparatus as set forth in claim 1, wherein said material consists essentially of a pure, non-metallic, rare earth metal compound.

7. Apparatus for producing a visible image in response to invisible radiation comprising:
   (a) a source of ultraviolet rays, X-rays, δ-rays, or rays of charged particles; and
   (b) a fluorescent screen exposed to rays from said source and including a layer of fluorescent material, said material being a compound having a formula selected from the group consisting of $(A_2O)_a(Ln_2O_3)_b(P_2O_5)_c$, $(Ln_2O_3)_p(Al_2O_3)_q(B_2O_3)_r$, and $LnZrF_7$
   wherein $a$ is zero or a positive integer not greater than 7,
   $b$, $c$, $p$, $q$, and $r$ are positive integers not greater than 7,
   A is at least one alkali metal, and
   Ln is at least one rare earth metal.

8. Apparatus for producing a visible image in response to invisible radiation comprising:
   (a) a source of ultraviolet rays, X-rays, δ-rays, or rays of charged particles; and
   (b) a fluorescent screen exposed to rays from said source and including a layer of fluorescent material, said layer essentially consisting of a single crystal of a compound having a formula selected from the group consisting of $(A_2O)_a(Ln_2O_3)_b(P_2O_5)_c$, $(Ln_2O_3)_p(Al_2O_3)_q(B_2O_3)_r$, and $LnZrF_7$
   wherein $a$ is zero or a positive integer not greater than 100, $b$, $c$, $p$, $q$, and $r$ are positive integers not greater than 100,
   A is at least one alkali metal, and
   Ln is at least one rare earth metal.

9. Apparatus for producing a visible image in response to invisible radiation comprising:
   (a) a source of ultraviolet rays, X-rays, δ-rays, or rays of charged particles; and
   (b) a fluorescent screen exposed to rays from said source and including a layer of fluorescent material, said material being a compound having a formula selected from the group consisting of $(A_2O)_a(Ln_2O_3)_b(P_2O_5)_c$, $(Ln_2O_3)_p(Al_2O_3)_q(B_2O_3)_r$, and $LnZrF_7$
   wherein $a$ is zero or a positive integer not greater than 100, $b$, $c$, $p$, $q$, and $r$ are positive integers not greater than 100,
   $b$ is smaller than the sum of $a$ and $c$, and $p$ is smaller than the sum of $q$ and $r$
   A is at least one alkali metal, and
   Ln is at least one rare earth metal.

10. Apparatus as set forth in claim 9, wherein said rare earth metal is Tb, Eu, Nd, Pr, Ce, or Gd.

11. Apparatus for producing a visible image in response to invisible radiation comprising:
    (a) a source of ultraviolet rays, X-rays, δ-rays, or rays of charged particles; and
    (b) a fluorescent screen exposed to rays from said source and including
       (1) a crystalline carrier substrate and
       (2) a layer of fluorescent material deposited on said substrate and secured to said substrate by epitactic growth.
       (3) said material being a compound having a formula selected from the group consisting of $(A_2O)_a(Ln_2O_3)_b(P_2O_5)_c$, $(Ln_2O_3)_p(Al_2O_3)_q(B_2O_3)_r$, and $LnZrF_7$
    wherein $a$ is zero or a positive integer not greater than 100, $b$, $c$, $p$, $q$, and $r$ are positive integers not greater than 100,
    A is at least one alkali metal, and
    Ln is at least one rare earth metal.

* * * * *

UNITED STATES PATENT AND TRADEMARK OFFICE
CERTIFICATE OF CORRECTION

PATENT NO. : 4103173
DATED : July 25, 1978
INVENTOR(S) : Hans-Günter Danielmeyer and Werner Hartmann It is certified that error appears in the above-identified patent and that said Letters Patent are hereby corrected as shown below:

Claim 1, line 3, change "$\delta$-rays" to -- $\gamma$-rays --.

Claim 7, line 3, change "$\delta$-rays" to -- $\gamma$-rays --;
line 9, change "$(B2O_3)_r$" to -- $(B_2O_3)_r$ --.

Claim 8, line 3, change "$\delta$-rays" to -- $\gamma$-rays --.

Claim 9, line 3, change "$\delta$-rays" to -- $\gamma$-rays --.

Claim 11, line 3, change "$\delta$-rays" to -- $\gamma$-rays --.

Signed and Sealed this

Sixth Day of February 1979

[SEAL]

Attest:

RUTH C. MASON
Attesting Officer

DONALD W. BANNER
Commissioner of Patents and Trademarks